US009860128B2

(12) United States Patent
McCaughan et al.

(10) Patent No.: US 9,860,128 B2
(45) Date of Patent: Jan. 2, 2018

(54) AUTOMATED COMMAND AND DISCOVERY PROCESS FOR NETWORK COMMUNICATIONS

(71) Applicants: Allied Telesis Holdings Kabushiki Kaisha, Tokyo (JP); Allied Telesis, Inc., Bothell, WA (US)

(72) Inventors: Geoffrey Douglas McCaughan, Rangoria (NZ); Graeme Keith Campbell, Christchurch (NZ)

(73) Assignee: ALLIED TELESIS HOLDINGS KABUSHIKI KAISHA, Tokyo (JP)

( * ) Notice: Subject to any disclaimer, the term of this patent is extended or adjusted under 35 U.S.C. 154(b) by 289 days.

(21) Appl. No.: 14/183,448

(22) Filed: Feb. 18, 2014

(65) Prior Publication Data
US 2014/0237047 A1 Aug. 21, 2014

(30) Foreign Application Priority Data
Feb. 19, 2013 (NZ) ........................................ 607298

(51) Int. Cl.
*H04L 12/24* (2006.01)
(52) U.S. Cl.
CPC ...... *H04L 41/0889* (2013.01); *H04L 41/0886* (2013.01); *H04L 41/0893* (2013.01); *H04L 41/12* (2013.01)
(58) Field of Classification Search
CPC ..... H04L 41/26; H04L 12/56; H04L 41/0886; H04L 41/0893; H04L 41/12; G06F 15/17
See application file for complete search history.

(56) References Cited

U.S. PATENT DOCUMENTS

| 6,363,495 | B1* | 3/2002 | MacKenzie | G06F 11/1482 714/37 |
| 7,603,458 | B1* | 10/2009 | Sexton | H04L 41/065 709/224 |
| 8,331,263 | B2 | 12/2012 | Dow | |
| 2002/0198010 | A1* | 12/2002 | Komsi | H04L 51/02 455/466 |
| 2003/0009551 | A1* | 1/2003 | Benfield | H04L 41/0213 709/224 |
| 2003/0133556 | A1* | 7/2003 | Naik | H04L 41/082 379/201.12 |
| 2004/0019668 | A1* | 1/2004 | Kakadia | H04L 41/046 709/223 |

(Continued)

FOREIGN PATENT DOCUMENTS

| EP | 2337275 | 6/2001 |
| EP | 2112788 A1 | 10/2009 |

OTHER PUBLICATIONS

Manual for Remote Control, www.teamview.com, Jan. 30, 2011, 84 pages.

*Primary Examiner* — Backhean Tiv
(74) *Attorney, Agent, or Firm* — Brooks Acordia IP Law, P.C.; Michael Zarrabian (57) ABSTRACT

The embodiments disclose a method for automatically communicating a command, received from a command server, to a set of nodes from a plurality of nodes on a network, executing the command on each node in the set of nodes and sending a response message from each node in the set of nodes to the command server indicating a type of executed action, wherein the set of nodes form a plurality of response messages.

17 Claims, 4 Drawing Sheets

(56) References Cited

U.S. PATENT DOCUMENTS

| | | | |
|---|---|---|---|
| 2005/0174364 A1* | 8/2005 | Malmstrom | G06F 3/0481 345/698 |
| 2005/0174365 A1* | 8/2005 | Malmstrom | G09G 5/00 345/698 |
| 2006/0265482 A1 | 11/2006 | Trisno et al. | |
| 2007/0124502 A1* | 5/2007 | Li | H04L 41/0226 709/246 |
| 2008/0052384 A1* | 2/2008 | Marl | H04L 12/2807 709/223 |
| 2008/0080410 A1* | 4/2008 | Tian | H04B 7/18543 370/318 |
| 2009/0049172 A1* | 2/2009 | Miller | H04L 41/12 709/225 |
| 2009/0067321 A1* | 3/2009 | Veits | H04L 45/02 370/217 |
| 2009/0147698 A1* | 6/2009 | Potvin | H04L 45/02 370/254 |
| 2009/0172556 A1* | 7/2009 | Malmstrom | G06F 3/0481 715/736 |
| 2009/0216724 A1* | 8/2009 | Cai | G06F 17/30873 |
| 2009/0222543 A1 | 9/2009 | Tannenbaum et al. | |
| 2010/0124176 A1* | 5/2010 | Fan | H04L 29/12584 370/250 |
| 2010/0162036 A1* | 6/2010 | Linden | G06F 11/181 714/4.11 |
| 2010/0269110 A1* | 10/2010 | Leijen | G06F 9/505 718/100 |
| 2011/0099255 A1* | 4/2011 | Srinivasan | H04L 41/0866 709/221 |
| 2011/0212761 A1* | 9/2011 | Paulsen | G06T 15/005 463/25 |
| 2013/0054966 A1* | 2/2013 | Clay | H04L 9/3273 713/168 |
| 2013/0282154 A1* | 10/2013 | Chappell | G05B 15/02 700/90 |
| 2014/0129696 A1* | 5/2014 | Browing | H04L 41/12 709/224 |
| 2014/0181839 A1* | 6/2014 | Xu | G06F 9/5088 718/107 |
| 2014/0215470 A1* | 7/2014 | Iniguez | G06F 9/4843 718/102 |
| 2015/0023213 A1* | 1/2015 | Soneda | H04W 40/32 370/254 |

* cited by examiner

AUTOMATED COMMAND AND DISCOVERY PROCESS FOR NETWORK COMMUNICATIONS

CROSS REFERENCE TO RELATED APPLICATIONS

This application is based on New Zealand Application Number 607298 filed Feb. 19, 2013, entitled "Improvements in and Relating to Network Communications," by First Named Inventor Geoffrey Douglas McCaughan.

BACKGROUND

Configuring physical networking equipment by way of direct communication with a specific network node is burdensome since a large network may have a large number of nodes that require configuration. In networks, which comprise more than a couple of nodes a user usually needs to individually configure each node in the network.

SUMMARY

Configuring networks including data communications networks requires a user to manually update each node on the network by entering commands on each node or by manually copying and running a script on each node. The embodiments include a method to configure a number of network related nodes quickly by way of a single interface using automated communications between a plurality of nodes on a network.

DETAILED DESCRIPTION

In a following description, reference is made to the accompanying drawings, which form a part hereof, and in which is shown by way of illustration a specific example in which the embodiments may be practiced. It is to be understood that other embodiments may be utilized and structural changes may be made without departing from the scope.

It should be noted that the descriptions that follow, for example, in terms of an automated command and discovery process for network communications is described for illustrative purposes and the underlying system can apply to any number and multiple types of network communications systems and devices. According to one embodiment, the system for providing an automated command and discovery process for network communications can be configured using user interaction with a command server. The system for an automated command and discovery process for network communications can be configured to include process steps of a node in response to the command server actions and can be configured to include a discovery process using the present embodiments.

Throughout this specification, the word "comprise", or variations thereof such as "comprises" or "comprising", may be understood to imply the inclusion of a stated element, integer or step, or group of elements integers or steps, but not the exclusion of any other element, integer or step, or group of elements, integers or steps.

The term "command server" describes a node which is configured to serve commands to other nodes in the network. Other nodes in the plurality of nodes may be referred to as "clients". The command server may be any node in the network on which the embodiments have been implemented. Different nodes in the network may perform the role of command server at different times. A node becomes a command server once a user logs into the node. More than one command server may exist. For example, when two or more users have logged into any node on the same network, each user will have created an instance of a command server.

The term "user" is used herein when referring to interaction with the command interface of nodes and the command server. In the context of network administration, a user may refer to either a physical person such as a network administrator or to an automated means such as a script running on a computer.

Figure 1:
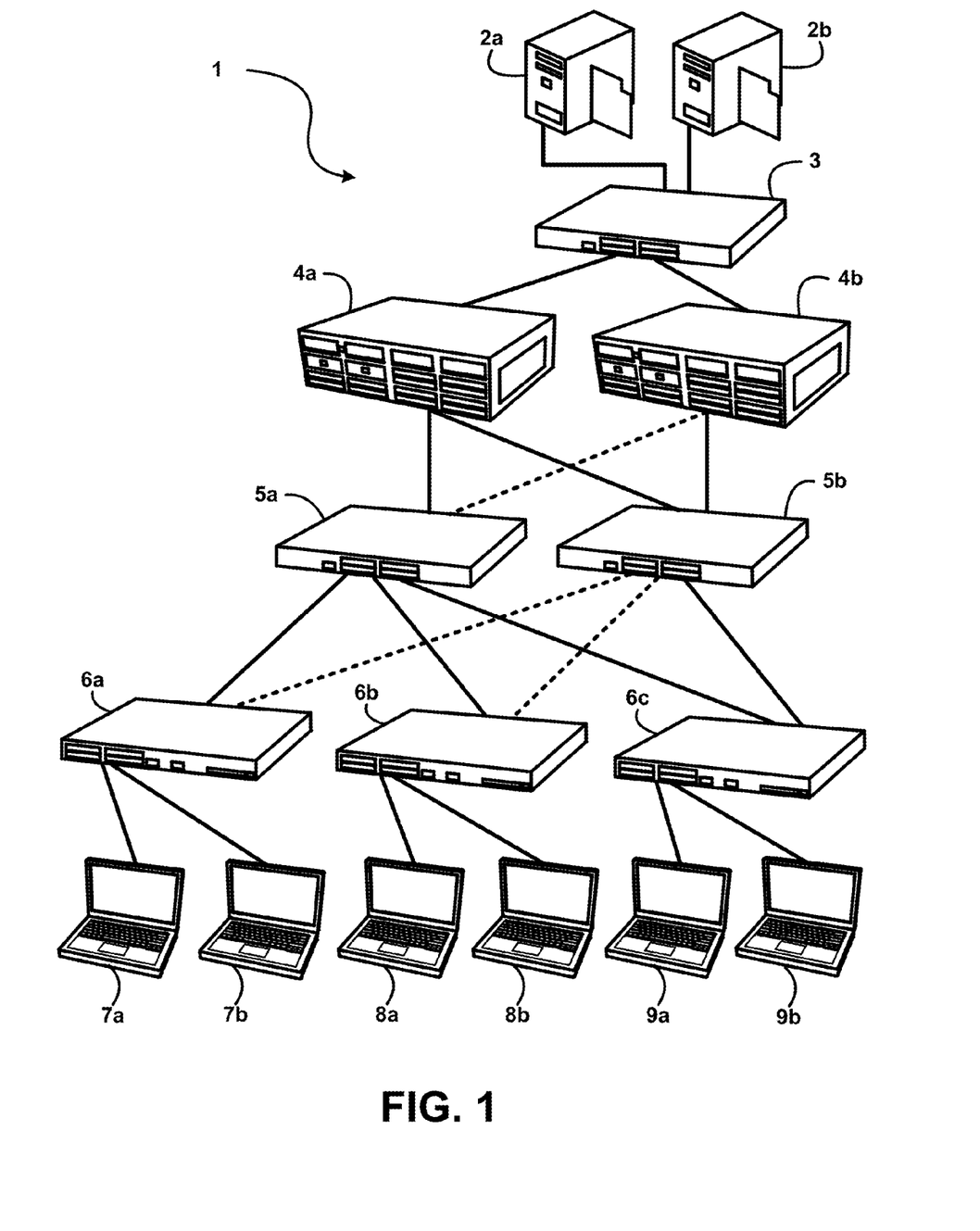
FIG. 1 shows an example of a schematic of an example network according to one embodiment.

FIG. 1 shows an example of a schematic of an example network according to one embodiment. The network comprises servers 2a and 2b which are networked to networked computers 7a, 7b, 8a, 8b, 9a, and 9b by way of a number of other network nodes, including a core switch 3, high speed distribution switches 4a and 4b, local distribution switches 5a and 5b and edge switches 6a, 6b, and 6c.

Descriptions and figures herein describe by example a typical command being issued on a command server and describe the control of a plurality of networked devices from a single device. Any compatible node on the network is able to act as the command server. Any node using the automated discovery process for network communications is considered to be a compatible node.

An Open Systems Interconnection (OSI) model defines a 7-layer networking framework to implement connection over the Internet. The base level (layer 1) is provided by the physical networking equipment which is configured to intercommunicate by way of transmitting information in the form of data packets across a network, whether wirelessly or by way of a physical medium. Each of the individual devices forming the physical layer of a network, and which are capable of sending, receiving, or forwarding information is referred to as a network node.

The current means of configuring a network node is typically by way of direct communication with the specific network node to be configured. For example, configuration may be provided by way of a user interface resident on the device, such as an embedded web server or text-based command-line interface (CLI), or a physical interface. In some existing networks, this command-line interface is available via a serial control port as well as remote login sessions (e.g. secure shell (ssh)). It would therefore be useful to be able to configure a number of related nodes quickly by way of a single interface.

According to one embodiment, entering at least one command on the command server may be performed manually. Manual commands may typically be entered by way of a text based user interface, such as a bash shell. According to one embodiment, there is provided a method of executing commands on a set of nodes within a plurality of nodes forming at least a portion of a data communications network, the set of nodes sharing at least one common command. The method is configured to include entering at least one command on a command server selected from the plurality of nodes, communicating at least one command to the other nodes in the set from the command server, and executing at least one command on each of the nodes in the set, wherein the command server may be any node in the plurality of nodes. According to some embodiments, entering at least one command on the command server may be performed by running a script or by another automated method.

According to some embodiments, nodes can be assigned to groups that share an identifier. A group refers to a set of nodes within the plurality of nodes in the network. The group members may typically share some common characteristic that may be used as an identifier. Examples of common characteristics may include the geographic location of the nodes within a network, the type of nodes, a product ID, or a particular feature provided by nodes. Specific examples of group ID may include "edge switches" or "second floor." Group IDs may arbitrarily be created by a user.

According to some embodiments, the set of nodes on which commands may be executed forms a "working set". Working sets are transient groupings of nodes, which are created by a user in order to allow commands to be sent to a set of nodes. Each node has at least one unique identifier. Each node may also include one or multiple group identifiers. The unique identifier or one or more group identifiers may be used to determine whether or not a particular node belongs to a particular working set.

When a user first logs into a node, the working set comprises just the node that the user has logged into. It is appreciated that, however, the working set may include one or more of any individual node on the network, a specific automatically-defined group of nodes, a specific user-defined group of nodes, any arbitrary aggregate of the above nodes, or all nodes on a network.

Commands may be sent synchronously to all nodes in the selected working set. A user may define the working set by specifying a unique identifier for each node or one or more shared identifiers that are common to each node in the desired working set. Once the user has specified the working set members, the command server may communicate, to the working set, with a command containing the identifier or identifiers. Some or all nodes in the network may send an acknowledgement message in response to the communicated command. The acknowledgement message may either be an acknowledgement that the node has joined the working set defined by the identifier or identifiers, or a message responding that the node may not join the working set.

The command server may compile a list of nodes which have responded that they have joined the working set. The number of nodes that join the working set defines a working set size. Any output message generated by commands communicated to and executed on each node in the defined working set is communicated back to the command server. Messages communicated back to the command server are reported to the user by one or more of logging of communicated messages, a visual indication, and/or an audible indication.

Logging of communicated messages may be the storing of messages, e.g., sent messages, response messages, etc., in memory associated with the command server. Storing of the messages may be permanent, until the record is deleted by a user, or may be temporarily stored for a period of time, or until a new record is created. Visual indications may include a display on a screen or a flashing light source. Audible indications may be as complex as voice messages or may comprise an audible tone. The command server may include a message parser, which collates the messages communicated back from the working set. The parser will generate and display a message to the user of the command server confirming the success or failure of execution of the communicated command on each node in the working set.

Messages communicated back from the working set may be parsed using a proxying layer. Parsing of the proxying layer may be implemented in software. The proxying layer is implemented to interface between the user interface of the command server and the command server parsing/execution mechanism. If multiple nodes send the same response message to the command server, that message may be aggregated and presented to the user as a single message. However, different nodes may send different messages to the command server. Examples of differing messages include error messages and status output displays. Each set of different messages may be presented to the user as a single separate message. The aggregated and non-aggregated messages also include information that identifies which node or nodes sent each message. This message aggregation enables users to quickly and easily make sense of messages communicated back from a large working set. The aggregation of messages is useful for informing a user that a node with an incompatible command set exists within the chosen working set. The user can then issue a further command, which is compatible with that, or those, nodes.

A working set may include nodes which feature disparate command sets. This is particularly the case where the working set comprises nodes which are physically different devices. However, it is also the case for nodes which utilize a modal type command set. An example of a modal command set is a hierarchical command set, in which certain features are configured as a subset of an overarching feature. For example, a network switch may have a top-level general configuration mode, from which users can enter a command to move to a lower-level routing configuration mode, from which users can enter another command to move to a still-lower level configuration mode to configure a particular instance of a particular routing protocol. In this example not all nodes in a network may participate in that particular instance of that example routing protocol. Therefore, a working set may contain nodes that participate in that instance of the routing protocol and nodes that do not.

Within a specified working set there may be nodes which are capable of executing a communicated command and others which are not. For clarity, the nodes within a working set which are able to execute a communicated command will be referred to as the "mode set." All of the nodes in a working set that are compatible with a particular command form a mode set within the working set. Whenever the command server communicates a command, each node in the working set will either join the mode set, or will remain only as a member of the working set. Any difference between the mode set size and the working set size may be visually indicated to the user of the command server. Members of the working set that are not compatible with a communicated command will respond to the command server with a response that includes which mode they are currently in. The response will make it possible for the command server to determine which nodes changed mode. Nodes explicitly inform the command server whether or not they have changed mode. Members of the working set that are not members of the mode set do not attempt to execute communicated commands. Nodes which are not in the mode set will not attempt to execute commands until a command arrives which they can execute, at which time they will execute the command and join the new mode set.

Some commands that can be executed on a networking node are interactive, result in a large number of output messages, or produce a continuous stream of output. In such cases, it may not be desirable for all nodes to communicate back to the command server simultaneously, as it becomes overly burdensome to aggregate the messages communicated back. Any instructions that are interactive, result in a large number of output messages, or produce a continuous stream of output are hereinafter referred to as "verbose commands". Examples of verbose commands include interactive commands, network diagnostic commands, commands that show detailed dynamic state, etc. Verbose commands can be executed if the working set contains only one member. When verbose commands are entered on the command server, the user may be prompted to make a selection of one or more nodes from the working set, in which case the command will then be executed on the selected node(s).

A database of nodes and other network information is created on each node in the network. Examples of other network information includes details of any active user sessions, user security keys or similar. Whenever a new node is added to the network or a node is removed from the network, the database is dynamically updated. Any changes to the database are mirrored across all nodes using inter process communication messages. This allows all the nodes in the network to remain synchronized with the current set of nodes in the network. Nodes are capable of autonomously maintaining the database with the current network structure. The database of network information is maintained on each node in the network. Messages communicated from the command server include a digital representation of the network information.

The command server maintains a digital representation of the current working set. The command server updates the digital representation of the current working set based on corresponding response messages sent to the command server by nodes in the network. The command server may confirm nodes in a working set that have executed a communicated command. Confirmation is made by matching nodes that have confirmed successful execution of the communicated command against the digital representation of the working set. A re-transmit process is initiated for nodes that do not confirm successful execution of the communicated command. If a node or set of nodes have not responded to the communicated command within a given time period, then the message is re-communicated, but this time the working set is modified to include only those nodes in the original working set that did not confirm successful execution of the communicated command. If a node or nodes do not respond within a given time period to the re-communicated message, then the digital representation is modified to remove the non-responding node or nodes.

According to some embodiments, a method of communicating commands to a set of nodes within a plurality of nodes that form at least a portion of a data communications network, includes accessing a user interface associated with a command server of the plurality of nodes, configuring the command server to address the set of nodes, entering commands on the command server, and relaying the entered commands from the command server to the set of nodes. Configuring the set of nodes involves specifying at least one identifier to identify the required nodes. An identifier may uniquely identify an individual node or may be common to multiple nodes on the network. Specifying said at least one identifier to select a set of nodes defines a working set. Configuring the command server to address the defined working set results in the command server communicating a working set command including the at least one identifier.

Nodes within the defined working set send an acknowledgement message in response to receiving the communicated working set command. The acknowledgement message is either an acknowledgement that the node has joined the defined working set, or a message responding that the node may not join the working set. After a working set has been defined, commands entered on the command server are communicated to the working set.

Commands may cause the nodes to change to a different command mode. Nodes in the working set that are able to change to the new mode will change mode, and will form a mode set. Nodes that cannot change to the new mode remain in the working set but do not join the mode set. Any node that does not join the mode set sends a response to the command server informing the command server that its attempt to execute the mode-changing command was unsuccessful. Additional commands communicated to the mode set may be ignored by nodes that are in the working set but that are not in the mode set. Commands entered on the command server may be executed substantially synchronously by each of the nodes in the mode set.

According to some embodiments, there is a command server configured for communicating commands to a plurality of nodes forming at least a portion of a network, the command server including a network interface, a non-volatile memory configured to store at least one working set identifier associated with the plurality of nodes, a database representing the network structure, and a user interface, wherein the database includes information on the types of nodes forming the network. The database of information includes information on what nodes exist within the network. The database includes a record of active user sessions, including a unique session identifier for each active session.

Figure 2:
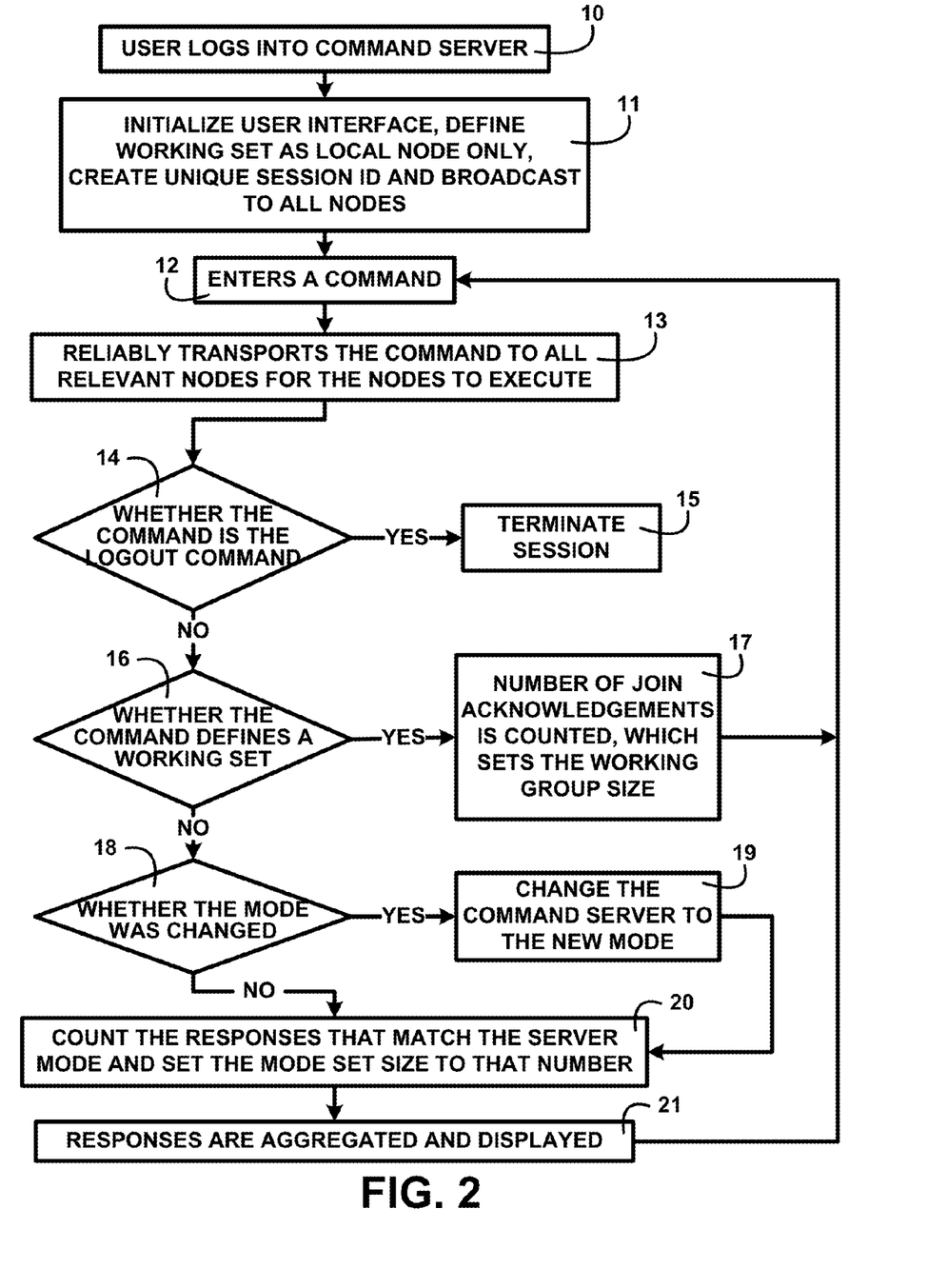
FIG. 2 shows a block diagram of an overview flow chart of a user interaction with a command server according to one embodiment.

FIG. 2 shows a block diagram of an overview flow chart of a user interaction with a command server of one embodiment. At step 10, a user logs into a command server. At step 11, one of the command servers for example server 2a of FIG. 1 then proceeds to initialize a user interface, define the working set as the local node only, create a unique session ID, and broadcast the session ID to all nodes. At step 12, the user enters a command. The server 2a of FIG. 1 reliably transports the command to all relevant nodes for the nodes to execute, at step 13.

The nodes have instructions that for example perform logic filtering. At step 14, an instruction can be for example a logic filter instruction, which can determine whether the command is the logout command. If the filter determines that the command is a logout command, then at step 15 the session is terminated. However, if the filter determines that the command is not a logout command, then the process continues to the next instruction.

At step 16, a logic filter instruction can be used to determine whether the command defines a working set. At step 17, the number of join acknowledgements is counted, which sets the working set size. At step 21, the number of join acknowledgements and the working set size, and the responses, are aggregated and displayed. The process returns to the command interface where the user can enter another command.

At step 18, it is determined whether the mode was changed if it is determined that the command does not define a working set. At step 19, the command server changes to the new mode if it is determined that the mode was changed. At step 20, a number of responses that match the server mode are counted and set the mode set size to that counted number. At step 21, the process proceeds to aggregate the responses and display them. The process then returns to the command interface where the user can enter another command. At step 18, if it is determined that the mode is not changed, then at step 20, a number of responses that match the server mode are counted and set the mode set size to that counted number. At step 21, the process proceeds to aggregate the responses and display them. The process then returns to the command interface where the user can enter another command.

FIG. 2, with reference to FIG. 1 and FIG. 2, shows a user (not shown) choosing a convenient, compatible, command server to issue commands on, and the user logs into command server 10 and into a particular node. For this example local distribution switch 5b is chosen to be the command server and will be designated as command server 5b for this example. Connection to command server 5b could be made using a remote client, for example, a laptop, logging into a web server on the command server 5b or similar. A user session is initiated by logging into the command server 5b. A user session results in the command line interface of the command server 5b processing to initialize the user interface, define the working set as the local node only, create a unique session ID and broadcast the session ID to all nodes 11, where the local node only is the command server 5b. A unique session ID is created and communicated to all other nodes 3, 4a, 4b, 5a, 6a, 6b and 6c. In one embodiment, the automated discovery process has been implemented on nodes 3, 4a, 4b, 5a, 5b, 6a, 6b and 6c, which are network switches. In other embodiments the network and nodes can comprise implementing the automated discovery process on other network configurations of any number of servers or PCs. In another embodiment multiple users can create sessions on different nodes in the network and perform administrative tasks. In each case a unique session ID is created.

Once initialization is complete the user is provided with access to the command server 5b user interface, which will typically be in the form of a command line interface such as a bash shell. At step 12, the user can enter a command using the user interface according to one embodiment.

At step 13, the entered command is processed to reliably transport the command to all relevant nodes for the nodes to execute. Reliable communication is achieved in any number of ways. In various embodiments, commands may be sent to relevant nodes by broadcast, multicast or unicast mechanisms and various mechanisms may be used to ensure reliable transport of communicated messages. In this example, the entered command is broadcast, and a retry mechanism is used to ensure reliable transport. In the retry mechanism, all nodes in the network respond to the command, and the command server 5b compares the number of responses with the number of nodes from which it expected a response. If any nodes have not responded, the command server 5b resends the command a pre-determined number of times, as tracked by a retry counter.

The process checks whether the command is a logout command, at step 14. At step 15, the unique session ID is destroyed if the command is a logout command. A logout command may be any command that results in command line exit or termination. If the command is not a logout command, at step 16, the command server 5b assesses whether the command defines a working set. At step 17, if the command defines a working set, the command server 5b proceeds to count number of acknowledgements and sets the working set size. It is appreciated that the acknowledgement messages may be indication that they have joined the working set. As such, the working set size may be set accordingly. The process may wait for the user to enter the next command. The command server may also store which nodes sent acknowledgement messages indicating that they have joined the working set, not just the number. The initial working set membership may include the command server 5b. As such, until a working set command is issued, commands will be executed on command server 5b only. If the command does not define a working set, then at step 18, the command server 5b assesses whether the mode changed. If the mode changes, at step 19, an instruction is sent to change the command server to the new mode. As such, the command server is in the same mode as members of the working set that successfully executed the command.

At step 20, the number of responses that match the server mode is counted and the mode set size is set to the counted number. Nodes which are in the working set, but which are not members of the mode set, do not execute the command. Nodes that do not execute the command send a response to the command server to indicate their current mode. The command server 5b performs a function to group any responses from the nodes that executed the command, aggregate the responses and display them 21 to the user. The process returns and waits for another user command, at step 12.

Figure 3:
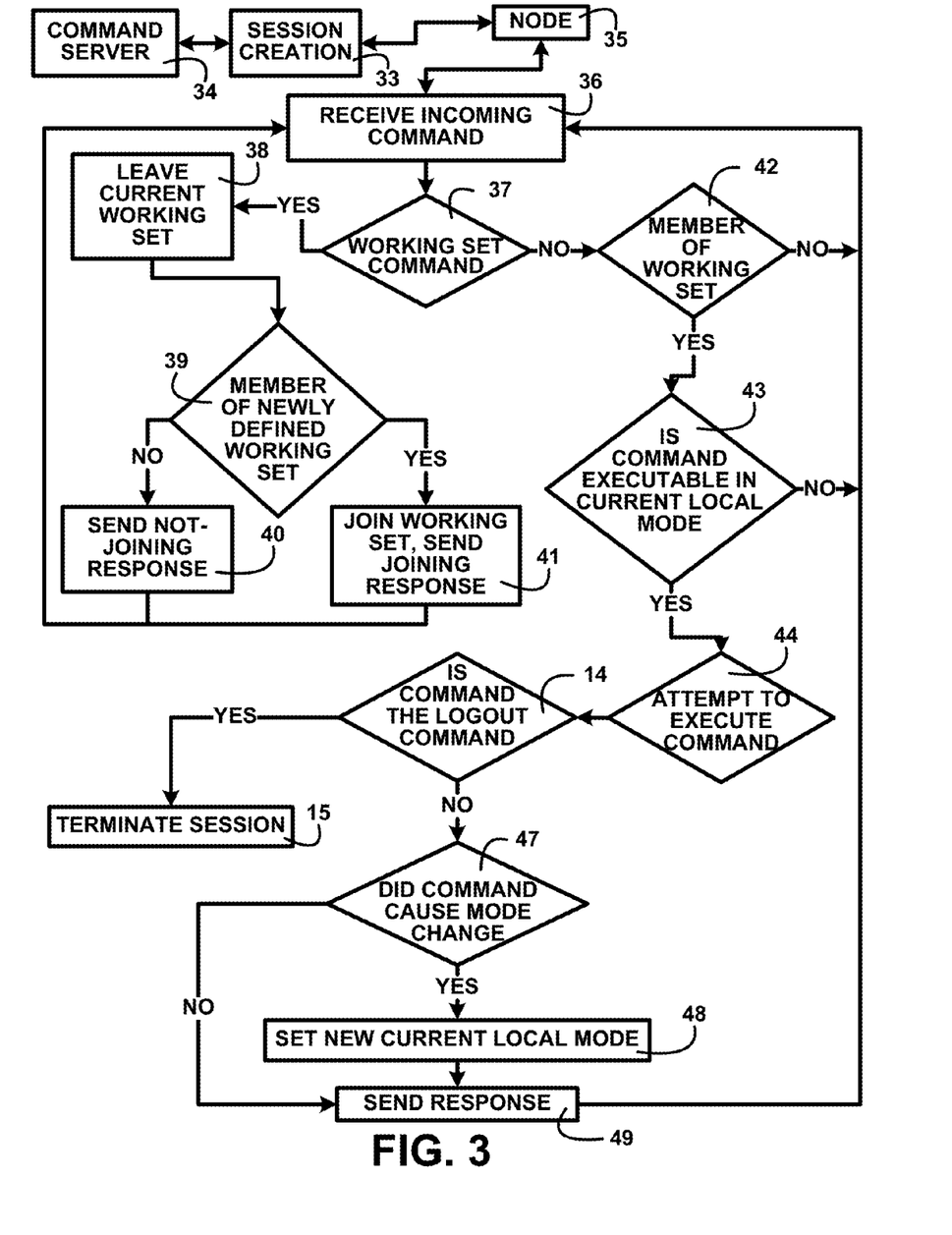
FIG. 3 shows a block diagram of an overview flow chart of the process steps of a node in response to the command server actions according to one embodiment.

FIG. 3 shows a block diagram of an overview flow chart of the process steps of a node in response to the command server actions of one embodiment. FIG. 3 shows a network session creation 33 in a compatible node 35 in response to the command server 34 actions. When a command server 34 initializes in response to a user logging on, a unique session ID is generated and is broadcast to all nodes on the network for the creation of a new user session. The command server 34 and each node 35 on the network synchronize during the creation of each new user session. Once synchronization is complete the synchronized nodes await communicated commands from the command server 34.

The node 35 begins a process to receive incoming command 36 from the command server 34. The node 35 follows instructions that for example perform logic filtering. At 37, the logic filter determines whether the incoming command action is a working set command. If so, at 38, node 35 exits any working set to which it currently belongs and checks 39 whether it is a member of the working set defined by the communicated working set command.

If it is determined that node 35 is a member of newly defined working set, then at 41 a joining response is sent from the node 35 to the command server 34. At 40, if the node 35 is not a member of the working set defined by the working set command, the node 35 will send not-joining response to the command server 34.

In one embodiment, node 35 upon determining that the received command 36 is not part of the working set command 37, determines at 42 whether the node is a member of working set. At 42, no response is sent from node 35 to the command server 34 if it is determined that node 35 is not a member of the working set. According to one embodiment, the command is ignored and the node awaits the next communicated command at 36. On the other hand, at 43 the node 35 checks to determine whether the command is executable in its current local command mode if it is determined that node 35 is a member of the working set at 42. If so, the communicated command is executed on the node 35 of one embodiment.

At 43, the node 35 checks whether the command is executable in its current local command mode. At 44, command execution is attempted if it is determined that the command is executable in the current local mode. At 14, the command is evaluated to determine whether the command the logout command. At 15, the session is terminated if it is determined that the command is a logout command.

On the other hand, at 47, it is determined whether the command caused a mode change if the command is not a logout command. A new current local mode is set, at 48, in response to the determination that the command caused a mode change at 47. At 49, a response is sent from the node 35 to the command server 34. Node 35 sends a response at 49 to the command server 34 in response to determining that the command did not cause a mode change.

At 43, if the communicated command is not compatible with the current local mode, the node 35 sends a message to the command server 34 indicating its current mode and that it did not attempt to execute the command.

At 49, the node 35 will send a response back to the command server 34 with a message indicating the success or failure of the command execution, plus any output generated by the command. Generated output may include for example a success message, or error messages, or output generated by execution of the command. According to one embodiment, messages are returned to the command server 34 which will aggregate the responses and display them 21 of FIG. 2 to the user.

Figure 4:
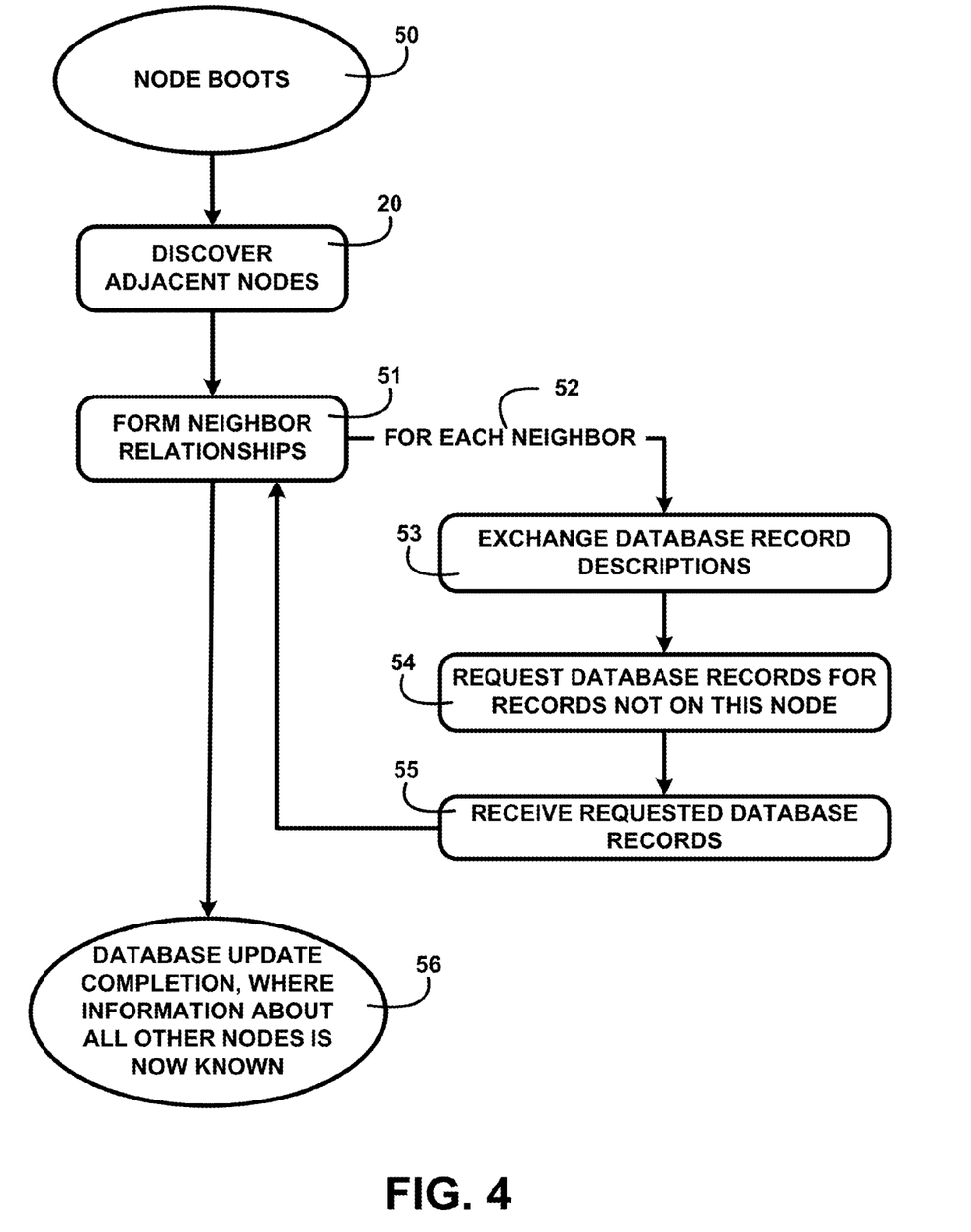
FIG. 4 shows a block diagram of an overview flow chart of a discovery process according to one embodiment.

FIG. 4 shows a block diagram of an overview flow chart of a discovery process of one embodiment. FIG. 4 shows prior to any interaction between nodes on the network and a user, the nodes in the network intercommunicate to determine the structure of the network. The sequence of discovering the network structure is illustrated in FIG. 4. Discovery is achieved by the periodic transmission of automated messages between nodes as generally indicated by a designator. Over time the structure of the network is determined and any change in the network structure, such as adding or removing of nodes, is dynamically managed. The network structure is stored in a database, which records, among other details, the number of nodes and the different node types. It will be appreciated that the record of the different types of nodes is used to generate a network size. The database of the network node structure is synchronized between all compatible nodes on the network.

When each node boots 50, it begins a discovery process to discover adjacent nodes 20. This process is used to form neighbor relationships 51. For each neighbor 52 in the relationship, the process is used to exchange database record descriptions 53, request database records for records not on this node 54, and receive requested database records 55. The discovery process results in a database update completion, where information about all other nodes is now known 56 according to one embodiment.

There are a number of advantages of the automated discovery process for network communications including the ability to run command line interface commands on multiple nodes in a network from a single interface. This saves time when configuration changes are to be made across several nodes. Command line interface commands can be issued once and propagated to each node in a specified working set. Aggregation of command line interface output and error messages from each node in a working set that commands are issued to provides useful diagnostic information to a user from a single location. Commands can be issued to a working set from a user interface associated with any node on the network that the current embodiments have been implemented on. This allows a user to select any convenient node to connect to, and issue commands to any other compatible node, or subset of nodes, on the network.

The foregoing has described the principles, embodiments and modes of operation of the present embodiments. However, the embodiments should not be construed as being limited to the particular embodiments discussed. The above described embodiments should be regarded as illustrative rather than restrictive, and it should be appreciated that variations can be made in those embodiments by workers skilled in the art without departing from the scope of the present embodiments as defined by the following claims.

What is claimed is:

1. A method comprising:
    automatically communicating a command, received from a command server, to a set of nodes within a plurality of nodes on a network for execution thereof;
    executing the command on each node in the set of nodes that is compatible with the command, and wherein execution of the command is unattempted by nodes in the set of nodes that are incompatible with the command until another command that is compatible with the nodes in the set of nodes that are incompatible with the command is received and executed;
    sending a response message from each node in the set of nodes to the command server indicating a type of executed action, wherein a plurality of response messages is created resulting from a response from each node;
    aggregating similar response messages from the plurality of response messages and reporting the aggregated response messages to a user, wherein the aggregated response messages include information informing the user that a node with an incompatible command set exists within the set of nodes, whereby the user can then issue a further command which is compatible with that node;
    automatically intercommunicating between the plurality of nodes on the network to discover a network structure, wherein a node is compatible with a communicated command if the node has a compatible command set for executing the communicated command; and
    storing the discovered network structure information including a number of nodes and different types of nodes which are used to generate a network size;
    wherein the set of nodes forms a working set, and wherein the response message includes an acknowledgement message, and wherein each response message of the plurality of response messages indicates whether a node associated with the each response message has joined the working set.

2. The method of claim 1, wherein each node of the set includes an identifier configured to identify each node within the set, and wherein a node is compatible with the communicated command if the node is capable of executing the communicated command.

3. The method of claim 1, wherein the command server is a node in the plurality of nodes on the network.

4. The method of claim 1 further comprising:
    reporting the plurality of response messages to the user;
    logging the plurality of response messages; and
    rendering the plurality of response messages, wherein the rendering the plurality of response messages includes one or more executed action selected from a group consisting of a visual indication and an audible indication.

5. The method of claim 1 further comprising:
executing a script on a computer to communicate at least one command automatically from the command server to a set of nodes.

6. The method of claim 1 further comprising:
automatically communicating from each node of the plurality of nodes to other nodes of the plurality of nodes;
synchronizing communication between the plurality of nodes; and
automatically exchanging information between the plurality of nodes.

7. An apparatus comprising:
a user interface comprising non-transitory machine readable medium including executable instructions for execution on a processor to connect to a command server for receiving input commands, wherein the user interface is further configured for accessing the command server from a plurality of nodes of a network, wherein the input commands and response messages from a set of nodes of the plurality of nodes are automatically communicated between the command server and the set of nodes; and
a communications system comprising a processor and addressable memory configured for automatically intercommunicating messages between the plurality of nodes to analyze the network and discover a structure associated with the network, wherein the network is analyzed by processing confirmation response messages from the plurality of nodes of the network, wherein the confirmation response messages indicate whether a node in the plurality of nodes of the network has successfully executed a command, wherein the network is discovered by comparing the confirmation response messages to a set of nodes within the plurality of nodes of the network for executing an executable command, wherein the discovered network structure information is stored including a number of nodes and different types of nodes which are used to generate a network size, wherein similar response messages are aggregated and the aggregated response messages are reported to a user, wherein the aggregated response messages include information informing the user that a node with an incompatible command set exists within the set of nodes, and whereby the user can then issue a further command which is compatible with that node;
wherein execution of a command is unattempted by nodes in the set of nodes that are incompatible with the command until another command that is compatible with the nodes in the set of nodes that are incompatible with the command is received and executed; and
wherein an input command is configured to include an identifier configured to define the set of nodes as a working set of nodes, and wherein a response message is configured to include an acknowledgement message indicating whether a particular node has joined the working set of nodes.

8. The apparatus of claim 7, wherein a response message from the response messages is configured for indicating whether a particular node associated therewith has joined a set of nodes defined with the input command as the working set of nodes.

9. The apparatus of claim 7 further comprising:
a node database configured to store network information including the network structure, the plurality of nodes of the network, each active user session with a unique session identifier associated with a node, and nodes leaving the network.

10. The apparatus of claim 7, wherein each node of the plurality of nodes automatically discovers the location and nature of other nodes of the plurality of nodes during boot up using the communications system.

11. The apparatus of claim 7, wherein the network includes a database of the network structure associated with each node in the network, and wherein a node is compatible with a communicated command if the node has a compatible command set for executing the communicated command.

12. The apparatus of claim 7, wherein intercommunicating messages are retransmitted to a subset of the set of nodes in absence of the confirmation response messages from the subset that the command was successfully executed, and wherein a node from the subset is removed from the structure responsive to the retransmission and in absence of receiving the confirmation response messages from the node of the subset that the command was successfully executed; and
wherein execution of a command is unattempted by nodes in the set of nodes that are incompatible with the command until another command that is compatible with the nodes in the set of nodes that are incompatible with the command is received and executed and wherein a node is compatible with a communicated command if the node has a compatible command set for executing the communicated command.

13. A process comprising:
periodically transmitting automated messages between a plurality of nodes of a network;
recording in a database node automated intercommunications based on the automated messages;
in response to the automated messages, analyzing confirmation response messages from the plurality of nodes of the network, wherein the confirmation response messages indicate whether a node in the plurality of nodes of the network has successfully executed a command;
aggregating similar response messages and reporting the aggregated response messages to a user, wherein the aggregated response messages include information informing the user that a node with an incompatible command set exists within a set of nodes, whereby the user can then issue a further command which is compatible with that node;
discovering a network structure by comparing the confirmation response messages to the set of nodes within the plurality of nodes of the network for executing an executable command, wherein a node is compatible with a communicated command if the node has a compatible command set for executing the communicated command;
storing the discovered network structure information including a number of nodes and different types of nodes which are used to generate a network size; and
dynamically managing any change in the network structure, wherein the managing includes modifying a number of nodes and updating records of the network structure in the database based on the discovering;
wherein the set of nodes forms a working set, and wherein the response message includes an acknowledgement message, and wherein each response message indicates whether a node associated with the each response message has joined the working set.

14. The process of claim 13, wherein updating the records of the network structure includes generating the network size using the number of nodes and different types of nodes.

15. The process of claim 13 further comprising:
synchronizing the network; and
updating the records of the network structure database on each node of the network.

16. The process of claim 13 further comprising:
transmitting automated messages when each node boots up;
exchanging records between each node of the network;
requesting records from the plurality of nodes using automated messages; and
receiving requested records on each node using the responses to automated messages.

17. The process of claim 13 further comprising:
retransmitting automated messages to a subset of nodes of the plurality of nodes in absence of the confirmation response messages from the subset that the command was successfully executed; and in response to the retransmitting and in absence of receiving the confirmation response messages from a node within the subset that the command was successfully executed, removing the node within the subset of nodes from the network structure;

wherein execution of a command is unattempted by nodes in the set of nodes that are incompatible with the command until another command that is compatible with the nodes in the set of nodes that are incompatible with the command is received and executed and wherein a node is compatible with a communicated command if the node has a compatible command set for executing the communicated command.

* * * * *